(12) United States Patent
Falk

(10) Patent No.: US 11,962,116 B2
(45) Date of Patent: Apr. 16, 2024

(54) RESISTANCE SOLDERING DEVICE AND METHOD OF USING SAID DEVICE

(71) Applicant: Aptiv Technologies AG, Schaffhausen (CH)

(72) Inventor: William Falk, Warwick, RI (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 661 days.

(21) Appl. No.: 17/159,421

(22) Filed: Jan. 27, 2021

(65) Prior Publication Data

US 2021/0273392 A1    Sep. 2, 2021

Related U.S. Application Data

(60) Provisional application No. 62/983,782, filed on Mar. 2, 2020.

(51) Int. Cl.
*H01R 43/02* (2006.01)
*B23K 1/00* (2006.01)
*B23K 3/03* (2006.01)

(52) U.S. Cl.
CPC ....... *H01R 43/0214* (2013.01); *B23K 1/0004* (2013.01); *B23K 3/033* (2013.01); *B23K 3/0392* (2013.01); *H01R 43/0235* (2013.01); *H01R 43/0242* (2013.01)

(58) Field of Classification Search
CPC ............ H01R 43/0214; H01R 43/0235; H01R 43/0242; B23K 1/0004; B23K 3/033; B23K 3/0392
USPC .... 219/72, 85.1, 85.12, 85.13, 85.14, 121.6, 219/121.65, 137.42, 230
See application file for complete search history.

(56) References Cited

U.S. PATENT DOCUMENTS

| 4,268,739 A | 5/1981 | Evans |
| 5,542,600 A * | 8/1996 | Kobayashi ....... G05B 19/41885 228/103 |
| 2001/0004982 A1* | 6/2001 | Moro .................... B23K 3/047 219/250 |

(Continued)

FOREIGN PATENT DOCUMENTS

| CN | 203316874 U | 12/2013 |
| CN | 208391208 U | 1/2019 |
| DE | 19605239 A1 | 8/1996 |

(Continued)

OTHER PUBLICATIONS

"Communication under Rule 71(3) received for European Patent Application No. 21157915.6, dated Aug. 2, 2022", 7 pages.

(Continued)

*Primary Examiner* — Phuong T Nguyen
(74) *Attorney, Agent, or Firm* — Billion & Armitage

(57) ABSTRACT

A resistance soldering device configured for using with an electrical terminal having a first surface and a second surface opposite the first surface on which a layer of a solder composition is disposed includes an electrode having a first electrical conductor configured to be connected to a positive pole of an electrical power supply, a second electrical conductor configured to be connected to a negative pole of the electrical power supply and an electrically resistive bridge interconnecting the first and second electrical conductors. A method of using such a device is also presented herein.

7 Claims, 6 Drawing Sheets

(56) References Cited

U.S. PATENT DOCUMENTS

2013/0301231 A1   11/2013   Lefevre et al.

FOREIGN PATENT DOCUMENTS

| JP | S4987549 A | 8/1974 |
| JP | 2009164400 A | 7/2009 |

OTHER PUBLICATIONS

Extended European Search Report for EP Application No. 21157915.6, dated Aug. 2, 2021, 10 pages.
Non Final Office Action received for China Patent Application No. 202110224486.7, dated Apr. 20, 2022, 10 pages.

* cited by examiner

RESISTANCE SOLDERING DEVICE AND METHOD OF USING SAID DEVICE

CROSS-REFERENCE TO RELATED APPLICATION

This application claims the benefit of U.S. Provisional Patent Application No. 62/983,782 filed Mar. 2, 2020, the entire disclosure of each of which is hereby incorporated herein by reference.

TECHNICAL FIELD

The invention generally relates to a resistance soldering, and more particularly relates to a resistance soldering device and method for attaching a metallic component, such as an electrical terminal to a conductive pad printed on a glass surface.

BACKGROUND

Resistance soldering is a process of heating a solder by passing an electrical current through a resistive electrode. This process has been used to solder electrical terminals to electrically conductive pads printed on glass surfaces. Prior resistance soldering devices typically required the object being soldered, e.g., electrical connectors and terminals, to be an electrically conductive element to complete the electrical heating circuit in the resistance soldering device. As electrical connectors and terminals become smaller, establishing a robust electrical contact between the resistance solder device and the electrical component becomes more difficult. On larger terminals with two independent electrical contact points, differences in resistance in the terminal can cause poor solder quality due to variance in temperature across the terminal. Therefore, a resistance soldering device that eliminates these issues to provide a more robust soldering process is desired.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

According to one or more aspects of the present disclosure, a resistance soldering device configured for using with an electrical terminal having a first surface and a second surface opposite the first surface on which a layer of a solder composition is disposed is provided. The resistance soldering device includes an electrode having a first electrical conductor configured to be connected to a positive pole of an electrical power supply, a second electrical conductor configured to be connected to a negative pole of the electrical power supply and an electrically resistive bridge interconnecting the first and second electrical conductors.

In one or more embodiments of the resistance soldering device according to the previous paragraph, the bridge has a fixed end connected to the first electrical conductor and a free end configured to directly contact the first surface of the electrical terminal and wherein the second electrical conductor contacts the bridge at a location closer to the free end than the fixed end.

In one or more embodiments of the resistance soldering device according to any one of the previous paragraphs, the bridge deflects the second electrical conductor, thereby providing a contact spring force between the bridge and the second electrical conductor.

In one or more embodiments of the resistance soldering device according to any one of the previous paragraphs, the bridge deflects the second electrical conductor defines a V-shaped notch at a contact point between the second electrical conductor and the bridge.

In one or more embodiments of the resistance soldering device according to any one of the previous paragraphs, the electrode is a first electrode and wherein the resistance soldering device further comprises a second electrode and a mechanism holding the first and second electrodes, the mechanism being configured to vary a distance between free ends of the first and second electrodes, thereby putting the first and second electrodes in position to contact two distinct points on the first surface of the electrical terminal.

In one or more embodiments of the resistance soldering device according to any one of the previous paragraphs, the electrode further comprises a thermally conductive foot in thermal communication with the bridge and is configured to contact two distinct points on the first surface of the electrical terminal.

In one or more embodiments of the resistance soldering device according to any one of the previous paragraphs, the thermally conductive foot is configured to be removeable from the resistance soldering device and replaceable with another thermally conductive foot defining a different pair of projections configured to contact the electrical terminal at two different points.

In one or more embodiments of the resistance soldering device according to any one of the previous paragraphs, the resistance soldering device further includes a temperature measuring device.

In one or more embodiments of the resistance soldering device according to any one of the previous paragraphs, the resistance soldering device further includes a pneumatic tube connected to an air movement device configured to cool the electrical terminal.

In one or more embodiments of the resistance soldering device according to any one of the previous paragraphs, the resistance soldering device further includes a spring device configured to apply a compressive force between the electrode and the first surface of the electrical terminal.

According to one or more aspects of the present disclosure, a method of resistance soldering includes the steps of:
  a) providing a controllable electrical power supply having a negative pole and a positive pole;
  b) providing an electrical terminal having a first surface and a second surface opposite the first surface on which a solder layer is disposed;
  c) providing a resistance soldering device with an electrode having a first electrical conductor connected to the positive pole of the electrical power supply, a second electrical conductor connected to the negative pole of the electrical power supply, an electrically resistive bridge interconnecting the first and second electrical conductors;
  d) turning the electrical power supply on to provide an electrical current between the positive and negative poles; and e) contacting the electrode to the first surface of the electrical terminal.

In one or more embodiments of the method according to the previous paragraph, the electrode is a first electrode. The resistance soldering device further includes a second electrode. Step e) further includes contacting the first and second electrodes on two distinct points on the first surface of the electrical terminal.

In one or more embodiments of the method according to any one of the previous paragraphs, the resistance soldering device further a mechanism holding the first and second electrodes. Step e) further includes varying a distance between free ends of the first and second electrodes via the mechanism.

In one or more embodiments of the method according to any one of the previous paragraphs, the electrode includes a thermally conductive foot defining a pair of projections sized, shaped, and arranged to contact the electrical terminal on at least two different points and configured to contact the first surface of the electrical terminal. Step e) further includes contacting the pair of projections on two distinct points on the first surface of the electrical terminal.

In one or more embodiments of the method according to any one of the previous paragraphs, the thermally conductive foot is configured to be removeable from the resistance soldering device and replaceable with another thermally conductive foot defining a different pair of projections configured to contact a different electrical terminal configuration on at least two different points. The method further comprises:
f) detaching the thermally conductive foot from the resistance soldering device; and
g) attaching the another thermally conductive foot to the resistance soldering device.

In one or more embodiments of the method according to any one of the previous paragraphs, the electrode includes a temperature measuring device. The method further includes:
h) determining a temperature of the electrode via the temperature measuring device;
i) determining whether the temperature at least meets a temperature threshold; and
j) performing step e) in accordance with the temperature at least meeting the temperature threshold.

In one or more embodiments of the method according to any one of the previous paragraphs, the resistance soldering device further includes a cooling device configured to cool the electrical terminal. The method further includes:
k) turning off the electrical power supply provided to the positive and negative poles; and
l) cooling the electrical terminal and the solder layer via the cooling device, wherein steps k) and l) are performed after completion of step e).

In one or more embodiments of the method according to any one of the previous paragraphs, the cooling device is a tube connected to an air movement device.

In one or more embodiments of the method according to any one of the previous paragraphs, the resistance soldering device further includes a spring device configured to apply a compressive force between the electrode and the electrical terminal. The method further includes:
m) applying the compressive force to the electrical terminal, wherein step m) is performed concurrently with step e).

In one or more embodiments of the method according to any one of the previous paragraphs, the spring device is a helical compression spring.

BRIEF DESCRIPTION OF THE DRAWINGS

The present invention will now be described, by way of example with reference to the accompanying drawings, in which.

Figure 1:
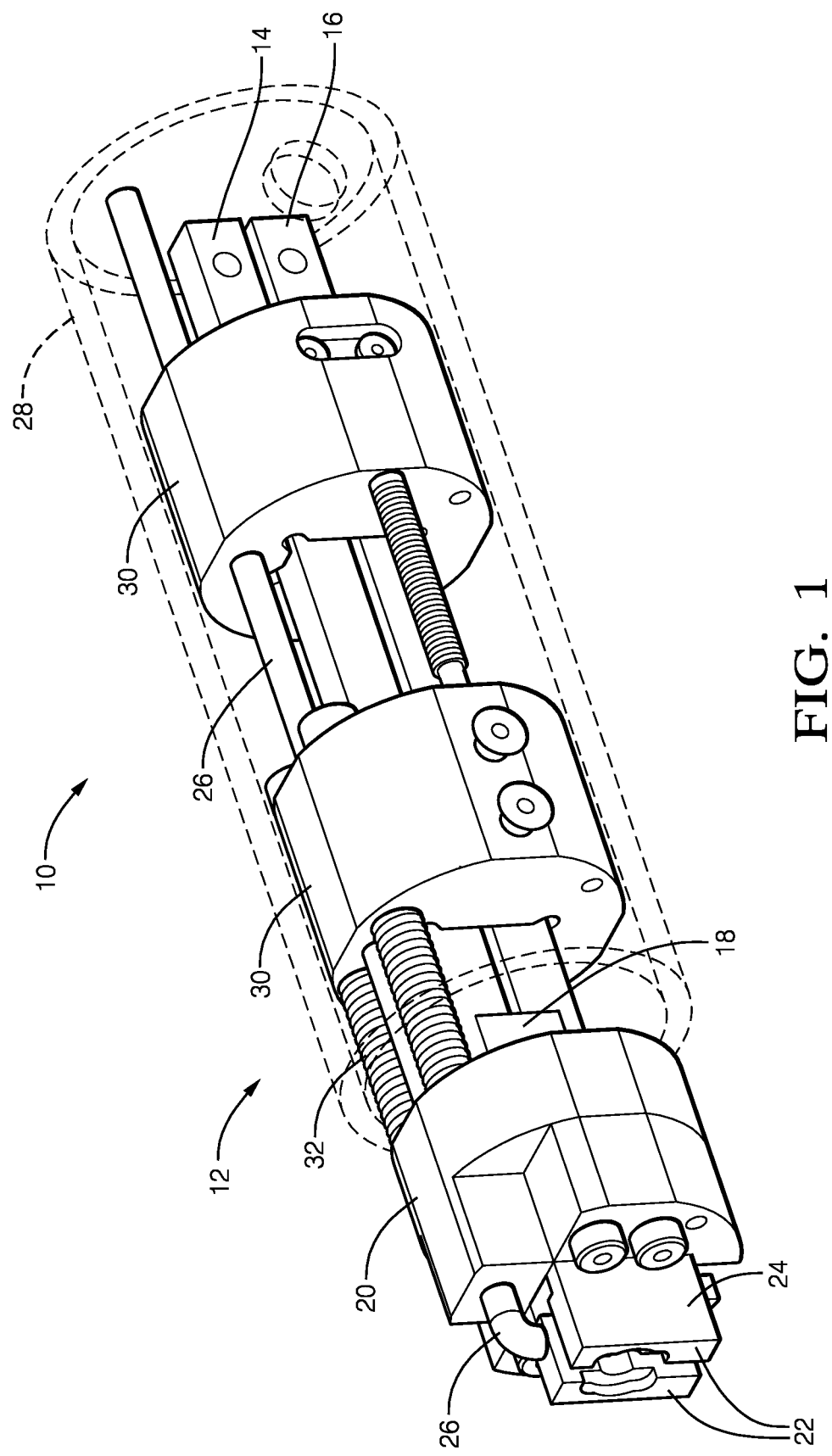
FIG. 1 is a cut-away view of a resistance soldering device according to some embodiments.

In the drawings, different versions of the elements of the various embodiments share the last two digits of the reference numbers.

DETAILED DESCRIPTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 4A:
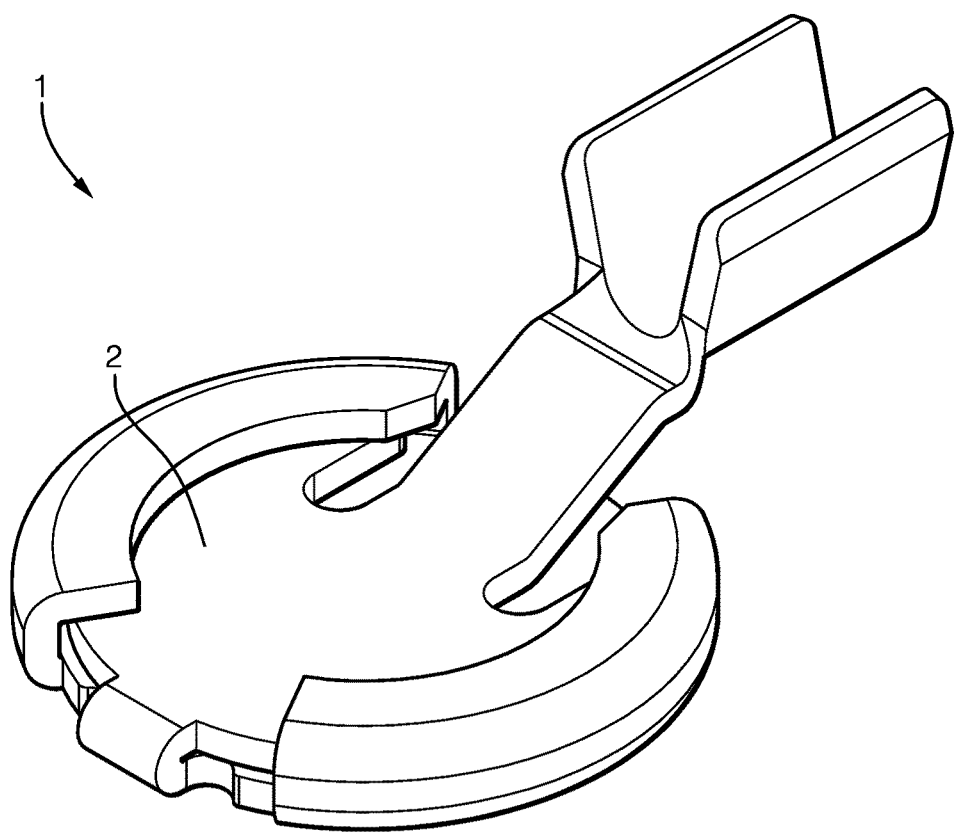
FIG. 4A is a top view of an example of an electrical terminal which may be soldered using the resistance soldering device of FIG. 1 according to some embodiments.
Figure 4B:
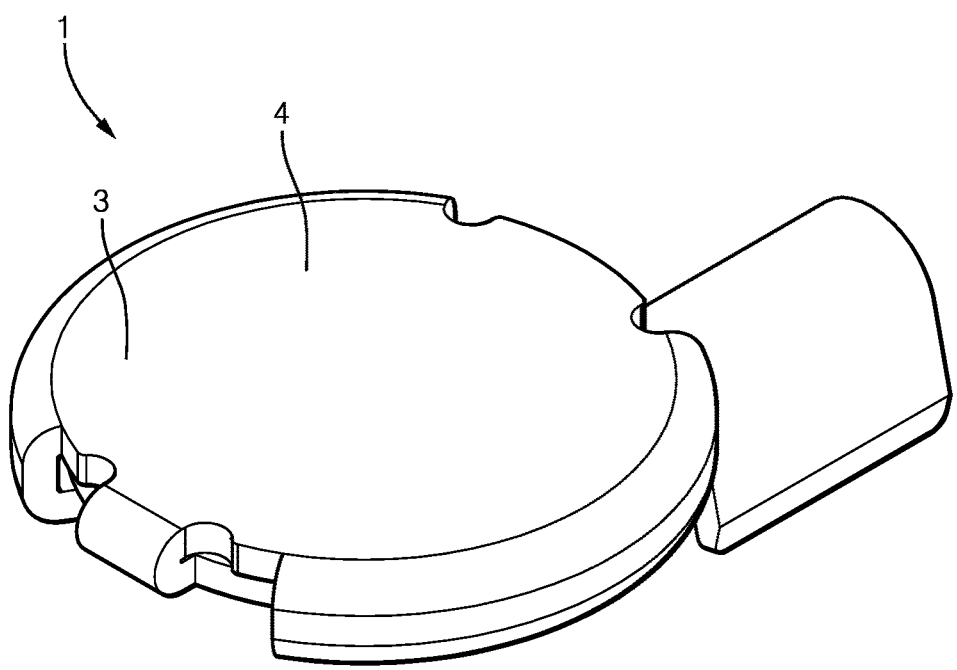
FIG. 4B is a bottom view of the electrical terminal of FIG. 4A according to some embodiments.

FIG. 1 shows a non-limiting example of a resistance soldering device, hereinafter referred to as the device 10 that is configured for using with an electrical terminal 1 (see FIGS. 4A and 4B) that has a first surface 2 with which the device 10 makes physical contact and a second surface 3 opposite the first surface 2 on which a layer of a solder composition 4, preferably a lead-free solder, is disposed. The illustrated terminal 1 is suited for attachment to a conductive pad on a glass surface, however the device 10 is capable of other resistance soldering applications. The device 10 includes an electrode 12 having a first electrical conductor 14 that, in operation, is connected to a positive pole of an electrical power supply and a second electrical conductor 16 connected to a negative pole of the electrical power supply. As illustrated, the first and second conductors 14, 16 are copper bus bars, however other embodiments may be envisioned in which other conductor types, e.g., braided wire cables, may be substituted for the bus bars. The electrode 12 also includes an electrically resistive bridge 18 that interconnects the first and second electrical conductors. The bridge 18 is preferably formed on an electrically conducive material having a greater resistance than the first and second conductors 14, 16, such as a carbon-based material. The electrode 12 also includes a thermally conductive foot 20, hereinafter referred to as the foot 20, that is in thermal communication with the bridge 18. The foot 20 is configured to contact the first surface 2 of the electrical terminal 1.

The foot 20 defines a pair of projections 22 that are configured to contact the first surface 2 of the electrical terminal 1. This pair of projections 22 are sized, shaped, and arranged to contact 1 at least two different points on the first surface 2 of the electrical terminal.

The foot 20 is configured to be removeable from the device 10 and replaceable with another thermally conductive foot (not shown) having a different design that defines a different configuration of the pair of projections that contact at least two different points of the electrical terminal configuration. This is particularly beneficial to adapt the device 10 for using with electrical terminals having different sizes or physical configurations.

The device 10 includes a temperature measuring device 24, such as a thermocouple device, that may be used to measure and control the temperature of the electrode 12 to ensure the temperature of the solder layer 4 on the second surface 3 is melted by raising the temperature of the terminal 1 above the liquidus temperature of the solder material when the electrode 12 contacts the first surface 2 of the terminal 1 and applies heat to the terminal 1.

The device 10 also includes a cooling device 26 that is configured to cool the electrical terminal 1, and particularly the solder layer 4 on the second surface 3, below the solidus temperature of the solder material after the device 10 has melted the solder layer 4. The cooling device 26 cools the electrical terminal 1 by blowing an air stream that is less than the solidus temperature of the solder material onto the electrical terminal 1. As shown in FIG. 1, the cooling device 26 is a cooling tube configured to be connected to an air movement device (not shown), such as a fan, blower, or air pump.

The device further includes a housing 28 and spacers 30 within the housing 28 to maintain the proper spacing of the first and second conductors 14, 16, the cooling tube 26, and the electrode 12 within the device 10.

The device additionally includes a spring device 32, such as a helical compression spring, configured to apply a compressive force between the electrode 12 and the electrical terminal 1.

Figure 2B:
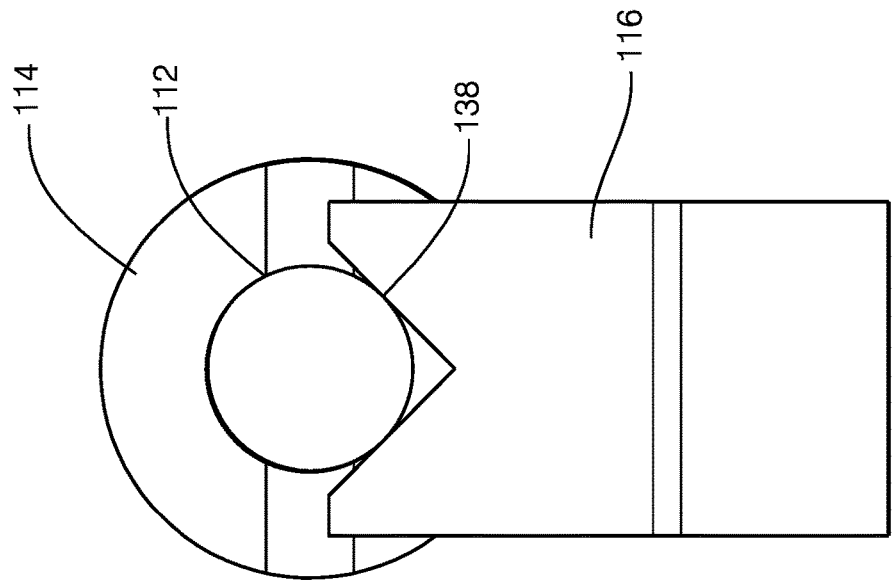
FIG. 2B is a bottom plan view of the contact electrode of FIG. 2A according to some embodiments.
Figure 2A:
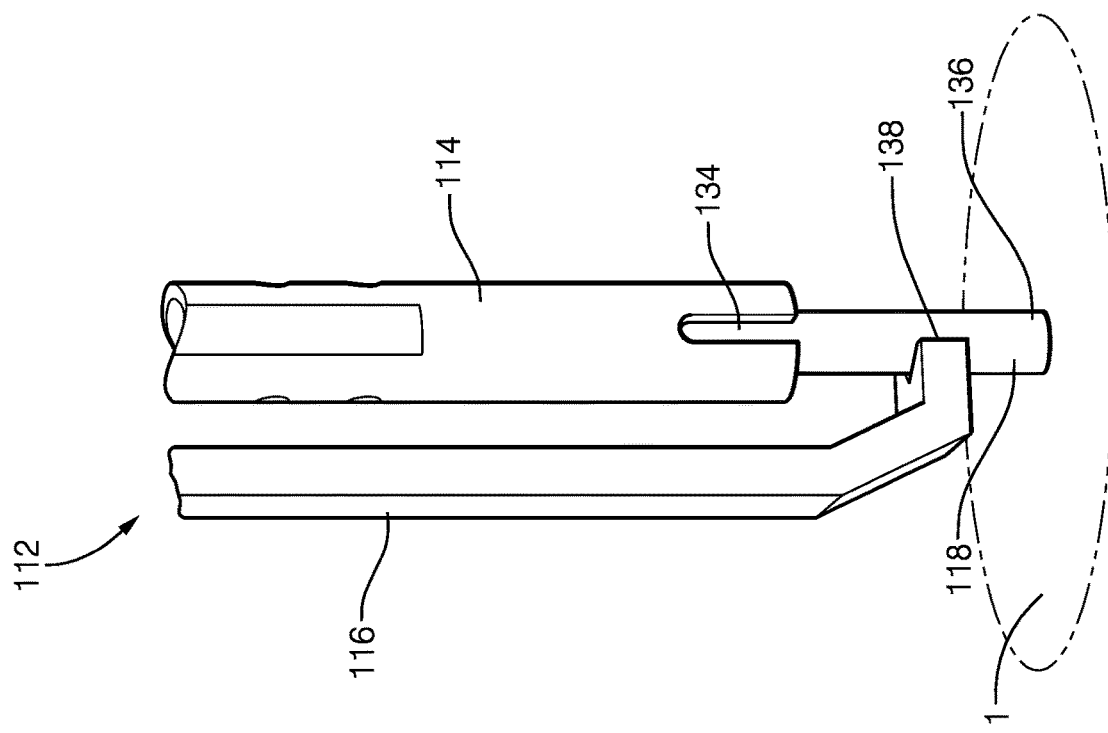
FIG. 2A is a perspective view of a contact electrode of a resistance soldering device according to some embodiments.

FIGS. 2A-3B illustrate an alternative embodiment of the device 100, particularly a different embodiment of the electrode 112. FIG. 2A illustrates that the first conductor 114 fixedly holds a fixed end 134 of the bridge 118 and a free end 136 of the bridge 118 is configured to directly contact the first surface 2 of the electrical terminal 1. The second conductor 116 is in the form of a curved elongate arm that contacts the bridge 118 at a contact point 138 that is located closer to the free end 136 than the fixed end 134. The second conductor 116 is sized, shaped, and arranged so that the bridge 118 deflects the second conductor 116 and generates a contact force between the contact point 138 of the second conductor 116 and the bridge 118. As shown in FIG. 2B, the contact point 138 has a V-shape so that bridges 118 having different diameters may be accommodated.

Figure 3A:
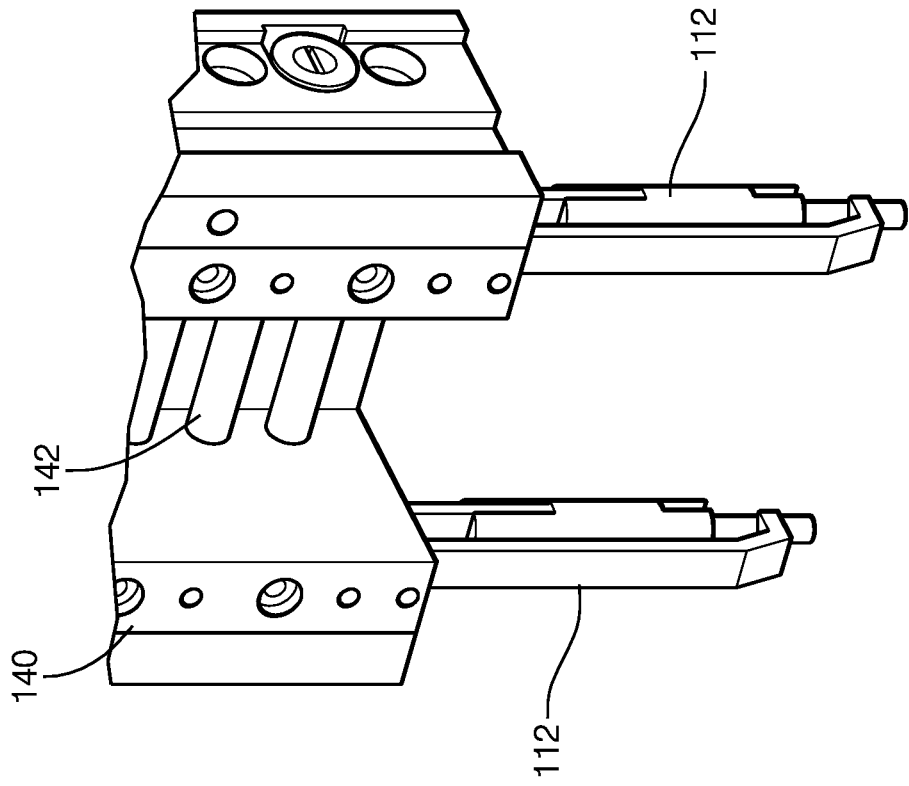
FIG. 3A is a perspective view of a device configured to vary a distance between two of the contact electrodes of FIG. 2A in a retracted configuration according to some embodiments.
Figure 3B:
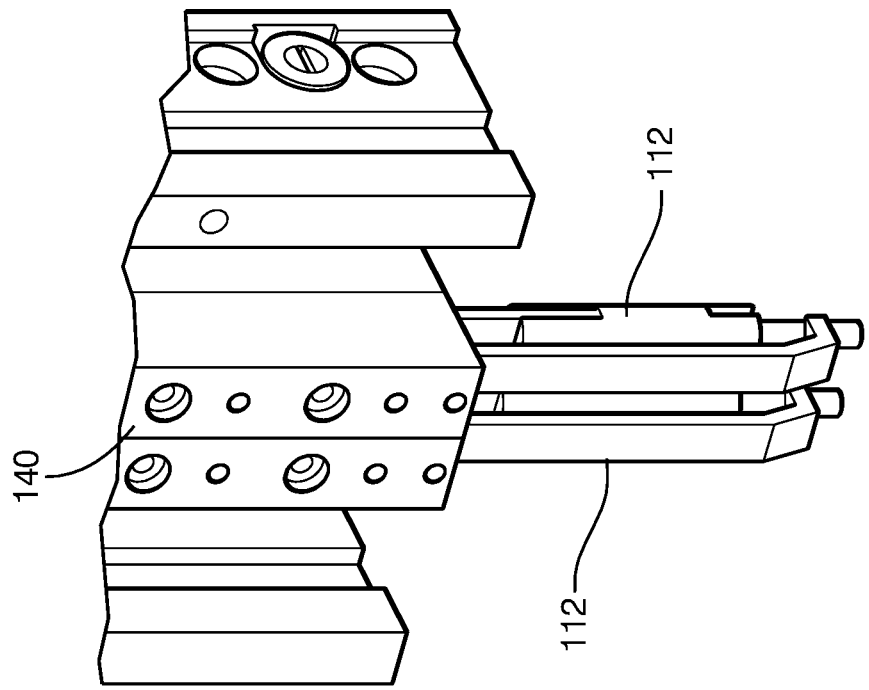
FIG. 3B is a perspective view of the device of FIG. 3A in a spread configuration according to some embodiments.

As seen in FIGS. 3A and 3B, the device 100 has two electrodes 112 that are mounted in a mechanism 140 that is configured to move the electrodes 112 closer, as shown in FIG. 3A or farther apart as shown in FIG. 3B to accommodate differently sized electrical terminals or to change the locations on the electrical terminal 1 to which heat is applied. The mechanism 140 may employ a screw drive 142 having an ambidextrous, i.e., right and left hand treaded rod, that is rotated to drive the electrodes 112 closer or farther apart.

Without subscribing to any particular theory of operation, the electrode 12 is heated to a first desired temperature, e.g., a temperature at or above the liquidus temperature of the solder material in the solder layer 4 of the terminal 1, by turning on the power supply and applying an electrical current through the bridge via the first and second conductors 14, 16. The power supply may be turned on by a human operator by activation of a switch or by an electronic controller. Once the temperature measuring device 24 indicates that the temperature of the electrode 12 reaches the desired temperature, the electrode 12 is brought into contact with the first surface 2 of the terminal 1 and a compressive force is applied to the terminal by the electrode 12 thorough the action of the spring device 32. The electrode 12 is brought into contact with the first surface 2 of the terminal 1 by the human operator or a robotic device controlled by the electronic controller and held in place until the solder layer 4 on the second surface 3 melts. After the solder layer 4 has melted, the power supply is turned off. The cooling device 26 is then activated to cool the the solder layer 4 to a second desired temperature that is less than the solidus temperature of the solder material. Application of the compressive force by the springe device is preferably maintained while cooling the terminal 1 to decrease the likelihood that the terminal 1 may move before the solder layer 4 has solidified. After the solder layer 4 has reached the second desired temperature and has solidified, the electrode is removed from the first surface 2 of the terminal 1. Removal of electrode 12 from the terminal 1 may be performed by the human operator or the robotic device under control of the electronic controller.

Figure 5:
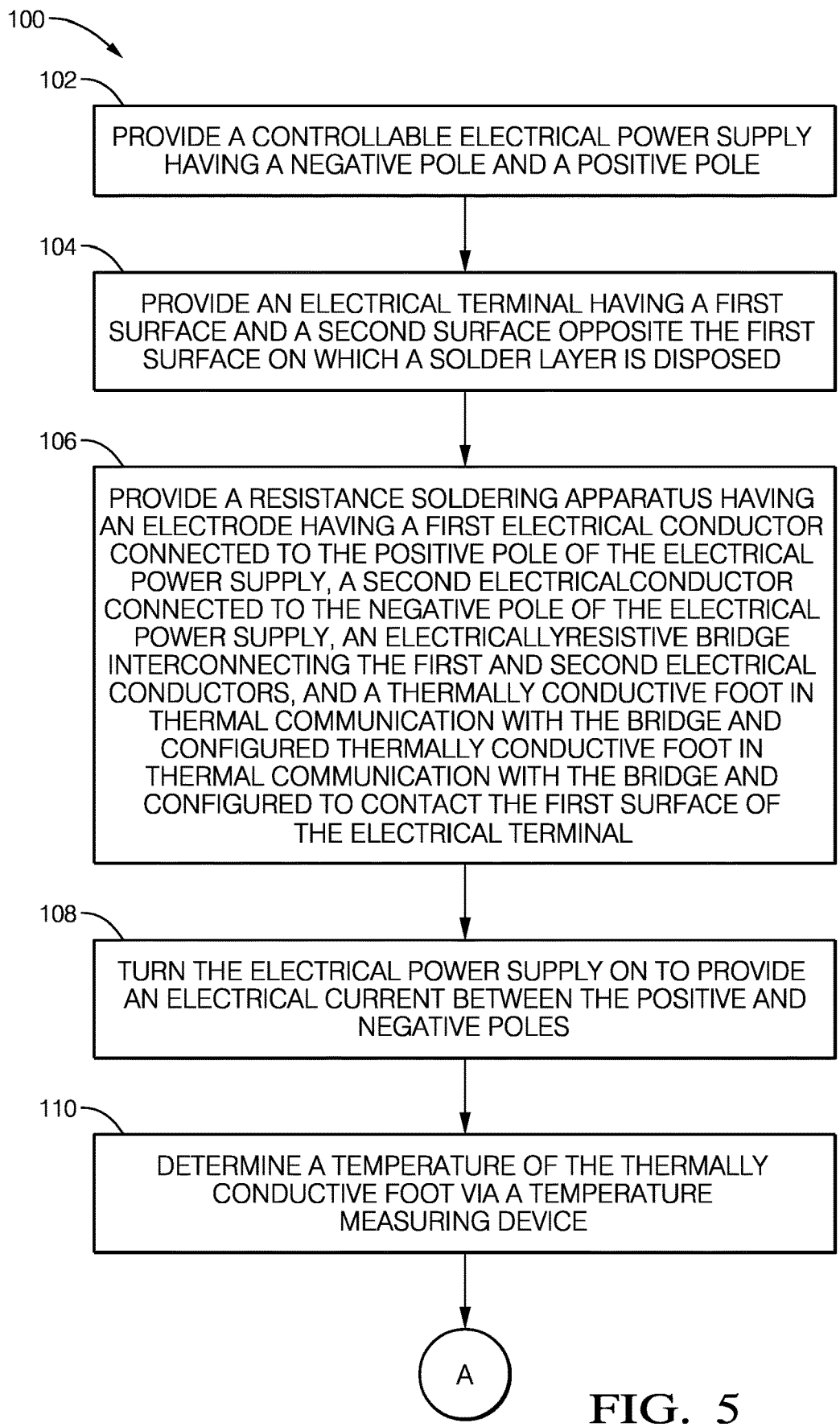
FIG. 5 is a flow chart of a method of resistance soldering according to some embodiments.
Figure 5:
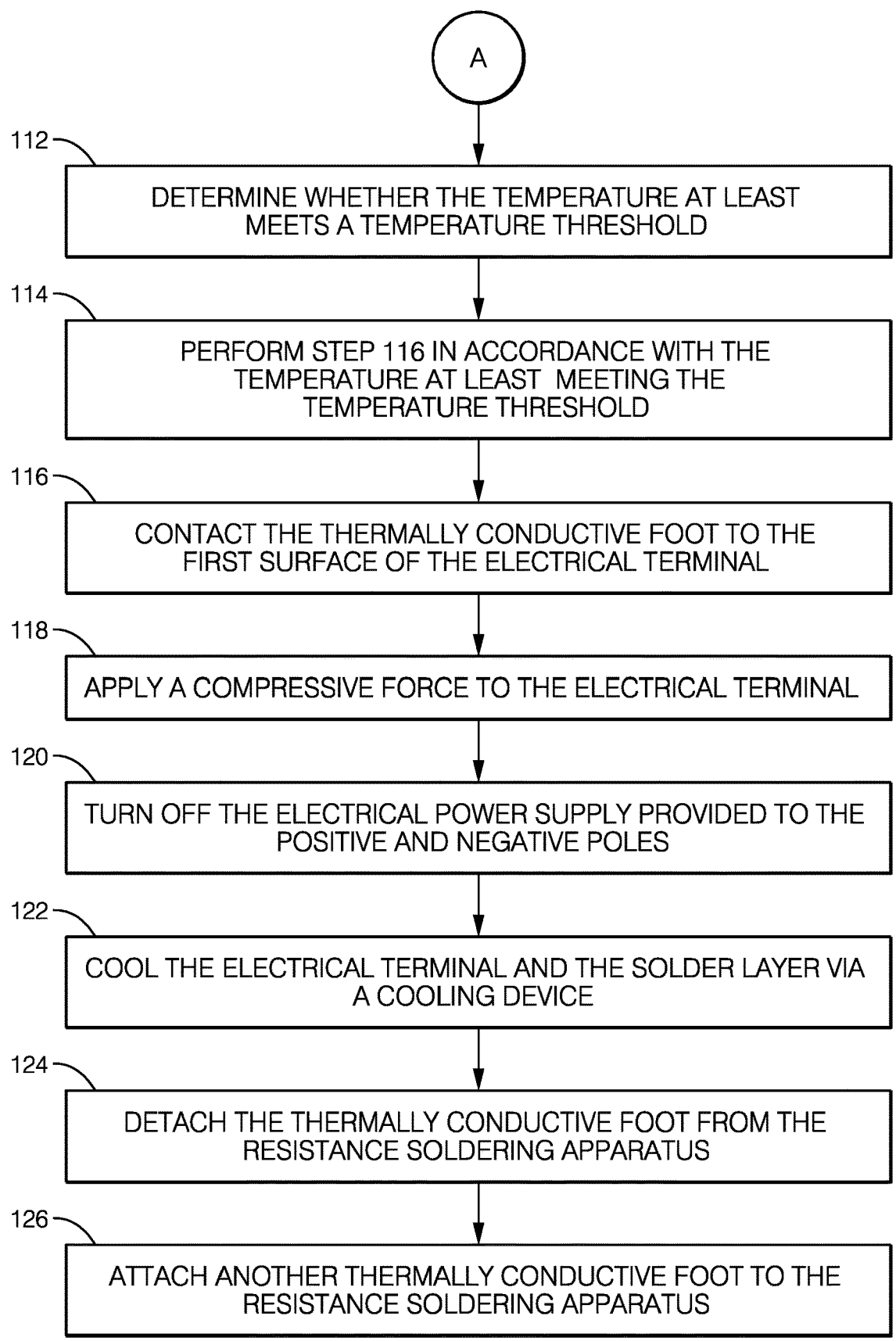

A non-limiting example of a method 200 of resistance soldering is presented in FIG. 5. The steps of this method 200 are described below:

STEP 202, PROVIDE A CONTROLLABLE ELECTRICAL POWER SUPPLY HAVING A NEGATIVE POLE AND A POSITIVE POLE includes providing a controllable electrical power supply having a negative pole and a positive pole;

STEP 204, PROVIDE AN ELECTRICAL TERMINAL HAVING A FIRST SURFACE AND A SECOND SURFACE OPPOSITE THE FIRST SURFACE ON WHICH A SOLDER LAYER IS DISPOSED, includes providing an electrical terminal 1 having a first surface 2 and a second surface 3 opposite the first surface 2 on which a solder layer 4 is disposed. The solder layer 4 is preferably a lead-free solder composition.

STEP 206, PROVIDE A RESISTANCE SOLDERING DEVICE HAVING AN ELECTRODE HAVING A FIRST ELECTRICAL CONDUCTOR CONNECTED TO THE POSITIVE POLE OF THE ELECTRICAL POWER SUPPLY, A SECOND ELECTRICAL CONDUCTOR CONNECTED TO THE NEGATIVE POLE OF THE ELECTRICAL POWER SUPPLY, AND AN ELECTRICALLY RESISTIVE BRIDGE INTERCONNECTING THE FIRST AND SECOND ELECTRICAL CONDUCTORS, includes providing the device 10 having an electrode 12 having a first electrical conductor 14 connected to the positive pole of the electrical power supply, a second electrical conductor 16 connected to the negative pole of the electrical power supply, an electrically resistive bridge 18 interconnecting the first and second electrical conductors 14, 16;

STEP 208, TURN THE ELECTRICAL POWER SUPPLY ON TO PROVIDE AN ELECTRICAL CURRENT BETWEEN THE POSITIVE AND NEGATIVE POLES, includes turning the electrical power supply on to provide an electrical current between the positive and negative poles;

STEP 210, DETERMINE A TEMPERATURE OF THE ELECTODE VIA A TEMPERATURE MEASURING DEVICE, is an optional step that may be performed when the electrode 12 includes a temperature measuring device 24, such as a thermocouple device. STEP 210 includes determining a temperature of the electrode 12 via the temperature measuring device 24;

STEP 212, DETERMINE WHETHER THE TEMPERATURE AT LEAST MEETS A TEMPERATURE THRESHOLD, is an optional step that may be performed when the electrode 12 includes a temperature measuring device 24. STEP 212 incudes determining whether the temperature measured by the temperature measuring device 24 at least meets a temperature threshold, e.g., a liquidus or solidus temperature of the solder layer 4;

STEP 214, PERFORM STEP 218 IN ACCORDANCE WITH THE TEMPERATURE AT LEAST MEETING THE TEMPERATURE THRESHOLD is an optional step that may be performed when the electrode 12 includes a temperature measuring device 24. STEP 214 includes performing STEP 218 of the method in accordance with the measured by the temperature measuring device 24 at least meeting the temperature threshold;

STEP 216, CONTACT THE ELECTRODE TO THE FIRST SURFACE OF THE ELECTRICAL TERMINAL, includes contacting the electrode 12 to the first surface 2 of the electrical terminal 1;

STEP 218, APPLY A COMPRESSIVE FORCE TO THE ELECTRICAL TERMINAL, is an optional step that may be performed when the device 10 includes a spring device 32, such as a helical compression spring, configured to apply a compressive force to the electrical terminal 1. STEP 218 includes applying a compressive force to the electrical terminal 1;

STEP 220, TURN OFF THE ELECTRICAL POWER SUPPLY PROVIDED TO THE POSITIVE AND NEGATIVE POLES, includes turning off the electrical power supply provided to the positive and negative poles;

STEP 222, COOL THE ELECTRICAL TERMINAL AND THE SOLDER LAYER VIA A COOLING DEVICE, is an optional step that may be performed when the resistance soldering device includes a cooling device 26, such as a tube connected to an air movement device, that is configured to cool the electrical terminal 1. STEP 218 includes cooling the electrical terminal 1 and the solder layer 4 via the cooling device 26;

STEP 224, DETACH THE THERMALLY CONDUCTIVE FOOT FROM THE RESISTANCE SOLDERING DEVICE, is an optional step that may be performed when the device 10 has a foot 20 that is configured to be removeable and is replaceable with another thermally conductive foot. STEP 224 includes detaching the thermally conductive foot 20 from the device 10; and STEP 226, ATTACH ANOTHER THERMALLY CONDUCTIVE FOOT TO THE RESISTANCE SOLDERING DEVICE, is an optional step that may be performed when the device 10 has a foot 20 that is configured to be removeable and is replaceable with another thermally conductive foot. STEP 226 includes attaching another thermally conductive foot to the device 10.

Accordingly, a resistance soldering device 10, 100 and a method 200 of resistance soldering is provided. The resistance soldering device 10, 100 and the method 200 provide the benefit of eliminating the need to have two electrical contact points on the object being soldered, i.e., the terminal 1, by closing the resistive heating circuit within the device 10, 100. By having a closed circuit within the electrode 12, 112, heat can be generated at the electrode 12, 112 and transferred to the terminal 1 being soldered. Additionally, except for residual heat from the soldering process, the device 10, 100 only becomes hot enough to melt solder when electrical power is supplied to the device 10, 100 when an operator or controller actives the power supply.

Although the present disclosure is not so limited, the following numbered examples demonstrate one or more aspects of the disclosure.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A resistance soldering device configured for using with an electrical terminal having a first surface and a second surface opposite the first surface on which a layer of a solder composition is disposed, said resistance soldering device comprising:

an electrode having a first electrical conductor configured to be connected to a positive pole of an electrical power supply, a second electrical conductor configured to be connected to a negative pole of the electrical power supply and an electrically resistive bridge interconnecting the first and second electrical conductors, wherein the bridge has a fixed end connected to the first electrical conductor and a free end configured to directly contact the first surface of the electrical terminal and wherein the second electrical conductor contacts the bridge at a location closer to the free end than the fixed end, wherein the bridge deflects the second electrical conductor, thereby providing a contact spring force between the bridge and the second electrical conductor, and wherein the second electrical conductor defines a V-shaped notch at a contact point between the second electrical conductor and the bridge.

2. The resistance soldering device in accordance with claim 1, wherein the electrode is a first electrode and wherein the resistance soldering device further comprises a second electrode and a mechanism holding the first and second electrodes, the mechanism being configured to vary a distance between free ends of the first and second electrodes, thereby putting the first and second electrodes in position to contact two distinct points on the first surface of the electrical terminal.

3. The resistance soldering device in accordance with claim 1, wherein the electrode further comprises a thermally conductive foot in thermal communication with the bridge and is configured to contact two distinct points on the first surface of the electrical terminal.

4. The resistance soldering device in accordance with claim 3, wherein the thermally conductive foot is configured to be removeable from the resistance soldering device and replaceable with another thermally conductive foot defining a different pair of projections configured to contact the electrical terminal at two different points.

5. The resistance soldering device in accordance with claim 1, further comprising a temperature measuring device.

6. The resistance soldering device in accordance with claim 1, further comprising a pneumatic tube connected to an air movement device configured to cool the electrical terminal.

7. The resistance soldering device in accordance with claim 1, further comprising a spring device configured to apply a compressive force between the electrode and the first surface of the electrical terminal.

\* \* \* \* \*